United States Patent

Bacon et al.

Patent Number: 5,533,322
Date of Patent: Jul. 9, 1996

[54] CONTINUOUS VERTICAL FORM-FILL-SEAL PACKAGING MACHINE WITH CONSTANT MOTION CARRIAGE

[75] Inventors: Forrest C. Bacon, Conyers; Gary G. Highberger, Atlanta, both of Ga.

[73] Assignee: Kliklok Corporation, Decatur, Ga.

[21] Appl. No.: 212,548

[22] Filed: Mar. 11, 1994

[51] Int. Cl.$^6$ ..................................................... B65B 9/00
[52] U.S. Cl. ................... 53/451; 53/550; 53/450; 53/551
[58] Field of Search ............................. 53/450, 451, 550, 53/551, 552

[56] References Cited

U.S. PATENT DOCUMENTS

| | | | |
|---|---|---|---|
| 2,626,494 | 1/1953 | Lewis | 53/86 |
| 3,256,673 | 6/1966 | Tew et al. | 53/182 |
| 3,543,468 | 12/1970 | Leasure | 5/28 |
| 3,596,428 | 8/1971 | Young et al. | 53/28 |
| 4,291,520 | 9/1981 | Prince et al. | 53/551 |
| 4,563,862 | 1/1986 | McElvy | 53/552 |
| 4,599,850 | 7/1986 | Kopp | 53/451 |
| 4,656,818 | 4/1987 | Shimoyama et al. | 53/551 |
| 4,663,917 | 5/1987 | Taylor et al. | 53/552 |
| 4,722,168 | 2/1988 | Heaney | 53/450 |
| 4,726,168 | 2/1988 | Seko | 53/450 |
| 4,727,707 | 3/1988 | Hadden | 53/451 |
| 4,744,202 | 5/1988 | Wylie | 53/451 |
| 4,751,808 | 6/1988 | Hadden | 53/451 |
| 4,757,668 | 7/1988 | Klinkel et al. | 53/451 |
| 4,759,170 | 7/1988 | Sawa et al. | 53/552 |
| 4,800,707 | 1/1989 | Rabus | 53/552 |
| 4,856,258 | 8/1989 | Barford et al. | 53/583 |
| 4,974,396 | 12/1990 | Gaukler | 53/551 |
| 4,996,825 | 3/1991 | Bacon et al. | 53/451 |
| 5,062,253 | 11/1991 | Bacon et al. | 53/451 |
| 5,092,450 | 3/1992 | Schommartz et al. | 198/460 |
| 5,241,800 | 9/1993 | Steinke et al. | 53/551 |
| 5,279,098 | 1/1994 | Fukuda | 53/451 |
| 5,388,387 | 2/1995 | McElvy | 53/551 |
| B1 4,288,965 | 3/1985 | James | 53/451 |

Primary Examiner—Lowell A. Larson
Assistant Examiner—Gene L. Kim
Attorney, Agent, or Firm—King & Schickli

[57] ABSTRACT

An improved stripping and sealing operation in a form, fill and seal packaging system is provided. Stepper and servo motors are computer controlled including by a 3-axis coordinator operating the X and Y motion of the sealing jaws, as well as the Y' motion of the film/tube feed. The Y motion is provided by oscillatory driving movement of the carriage to move the stripper/sealing jaws in a substantially constant modified sine wave profile. The Y' motion is variable and tracks the carriage to precisely size and form the bag. Blousing is also provided by tube/carriage relative motion also induced by varying the film/tube feed.

12 Claims, 4 Drawing Sheets

CONTINUOUS VERTICAL FORM-FILL-SEAL PACKAGING MACHINE WITH CONSTANT MOTION CARRIAGE

TECHNICAL FIELD

The present invention relates to the field of form, fill and seal packaging systems, and more particularly to an improved bag stripping/sealing operation that is computer controlled for enhancing the formation of bags at maximum efficiency and packaging speed.

BACKGROUND OF THE INVENTION

Machines and related methods for forming, filling and sealing of flexible, pillow-shaped bags made from continuous film are widely used to package a variety of loose products, such as snack foods, frozen foods and the like. These machines typically comprise a supply of packaging film in the form of a web, a tube former for converting the web into a continuous, vertically extending hollow tube and a reciprocating carriage with opposed jaws for stripping, sealing and cutting the tube into a series of filled bags. One of the most successful approaches for stripping/sealing calls for mounting of the stripper/sealing jaws on a carriage that is driven for reciprocating/oscillating movement in the direction of bag forming.

The sealing jaws in a typical packaging machine or method of this type are brought together in two steps. The first step closes the sealing jaws just sufficiently to bring the attached plate-like stripper jaws, which are usually mounted just below the sealing jaws, into engagement to flatten the film tube. The stripper jaws are moved downwardly faster than the constant rate of movement of the film/tube. In this way, the stripper jaws are effective to strip any product from the zone of the tube immediately above, which is the area subsequently to be sealed. The second step completes the closing of the bag by slowing the longitudinal movement of the stripper/sealing jaws to synchronize them with the film and then bringing the sealing jaws together to form the seal and to cut the bag just formed from the tube.

After each bag is formed, the feed of the film/tube is stopped and the strippers/jaws move in the reverse direction back to the top dead center (TDC) position in readiness for producing the next bag. In the early machines of this type, the film/tube feeding is typically provided by pulling the film through the movement of the carriage; however, it is also taught in later efforts to assist the feeding by employing powered rollers or belts on opposite sides of the tube along the forming mandrel of the machine. In order to produce longer bags, the machines typically provide a longer carriage stroke and/or longer assisted film movement. While these intermittently operating machines and methods have worked well in the past, the speed has been limited.

The next step that has taken place relatively recently is a machine enhancement wherein continuous film feed is employed to thereby provide increased speed of operation of the packaging system. In this arrangement, the film feed by the carriage in synchronization with the roller or belt film feed takes up only part of the bag forming cycle; that is, during the bag forming movement of the carriage in the downward direction. As the carriage returns to the TDC position, the film continues to move with the carriage being synchronized to follow the feeding of the film, which as far as we are aware is maintained substantially constant. A typical arrangement in this respect is shown by the Gaukler U.S. Pat. No. 4,974,396, issued Dec. 4, 1990. While this arrangement is an improvement over the intermittent system, it still leaves much to be desired in terms of attaining the desired higher packaging speeds of upward to 120 bags per minute.

In this regard, we have discovered that the bottle neck in realizing the higher speeds is the inability to reciprocate or oscillate the stripper/sealing jaw carriage with the greater acceleration/deceleration that is required. For successful stripping, as well as other ancillary operations, such as blousing of the bag, more rapid acceleration/deceleration to obtain the proper movement relative to the continuous and constant film/tube movement is necessary. The techniques used heretofore, such as the mechanical crank and lever arrangement, even with a servo motor used as the power source for operating the carriage, are simply incapable of rapid enough acceleration/deceleration.

Other approaches have been tried to increase the output of form, fill and seal packaging machines, such as converting the reciprocating carriage to a large, rotating head employing in effect multiple carriages. These carriages are supported in a circle, or along an extended endless path, to allow continuous rather than intermittent operation. As is readily apparent, employing an arrangement of this type is very costly in that each extra carriage represents a substantial cost add on for a machine. Furthermore, each additional carriage adds substantial mass, and thus operating inertia to the rotating head assembly, making it very difficult to change the movement of each carriage to make any necessary correction in timing.

Furthermore, with each of the prior art devices, the speed of movement of the carriage or carriages, must be increased to provide larger or longer bags. Thus, each time a package size change is made, a change must be made in any downstream handling system, such as in the case of the use of a case packer or an individual bag in a box loading machine. As a result, the case packer or loading machine must either be reduced in speed, or a second form, fill and seal packaging machine brought on line, along with a separate conveying and synchronizing conveyor system, such as shown in the Schommartz U.S. Pat. No. 5,092,450, issued Mar. 3, 1992. The requirement for multiple machines, as well as the elaborate conveyor/synchronizer adds additional expense to the packaging line.

While these shortcomings have been tolerated in the prior art, there have been some advances that have successfully allowed increases in speeds and packaging efficiency that are sorely needed in the industry. This even includes improving the relative longitudinal movement (Y axis motion) of the carriage and/or film/tube, which was originally contemplated for intermittent motion machines/methods. One of these new systems for improved feeding of packaging film by the use of computer controlled stepper motors is set forth in U.S. Pat. No. 4,727,707, issued Mar. 1, 1988, and assigned to the same assignee as the present invention. The feeding of the film is maximized in terms of speed and efficiency and can be controlled in order to adapt the machine for an infinite variety of bag sizes. In this particular case, the intermittent film feed is maximized in terms of speed and efficiency by constantly accelerating the film over the first half of the driving time, and constantly decelerating the film over the remaining half. By changing the speed of the carriage, and thus the stripper/sealing jaws, the proper stripping and sealing functions can be obtained.

From this advancement in a machine with the single reciprocating/oscillating carriage, the next step in the advancement of the technology turned out to be controlling the in and out movement of the stripper/sealing jaws so as to be just the right amount needed for a particular bag girth. In addition, in a similar manner, advances have been made to minimize the length of the carriage drive with the stripper/sealing jaws so as to be exactly according to bag size. These advancements to maximize packaging speed and efficiency with the primarily prior art intermittent film feed concept are shown in U.S. Pat. Nos. 4,996,825, issued Mar. 5, 1991 and 5,062,253 issued on Nov. 5, 1991, also assigned to the present applicant.

At the time these advances were made, it is felt by many in the industry that the form, fill and seal packaging operation had been brought to the optimum operating speed and efficiency where a reciprocating/oscillating carriage with its attendant cost and efficiency of operation advantages are concerned. However, we have recently discovered that a key additional advance is possible in the area of controlling and coordinating the relative movement of the packaging film/tube and the carriage that mounts the stripper/sealing jaws. More specifically, the improvement is possible in the area of assuring that the factor of the mass, and thus the inertia, of the carriage is removed as a limiting factor in the performance of the stripping and sealing operation. As a result, the speed and efficiency of a packaging machine or method utilizing a single reciprocating/oscillating carriage can rival the speed of operation of the much more costly machines utilizing the rotating head assembly type machines with multiple carriages.

SUMMARY OF THE INVENTION

Accordingly, it is a first object of the present invention to provide a film feeding, stripping and sealing system and related method for packaging that gains improved efficiency and speed in order to compliment the advances of the prior art when utilizing a single reciprocating/oscillating carriage.

It is another object of the present invention to provide a packaging apparatus and related method for combined film feeding and sealing of a continuous film to form bags in a precise manner while minimizing the effects of inertia of the carriage.

It is still another object of the present invention to provide an apparatus and method for continuous film feeding that not only minimizes the length of carriage drive along the longitudinal direction of the film movement, and allows bag size to be easily selected to maximize packaging speed and efficiency, but also allows maintaining a constant or continuous profile motion of the carriage that minimizes the effects of operating inertia on the carriage.

It is still another object of the present invention to provide a new packaging system that provides for precise control of the stripping/sealing for forming of the bag while minimizing the cycle time through maintaining a constant modified sine wave motion of the carriage.

It is still another object of the present invention to provide a packaging system with a moveable carriage that is moved in a constant motion without variation; the feeding of the film being at a variable, programmed rate that provides for high efficiency formation of a bag at a selected size, including with stripping, if desired.

It is still another object of the present invention to provide a combined feeding, stripping and sealing apparatus and method characterized by maximum packaging speed wherein carriage movement is maintained substantially constant and the film is fed at a variable rate and tracks the carriage movement for performing the stripping/sealing functions.

It is still a further object of the present invention to provide a feeding, stripping and sealing system for forming a bag from a continuously moving film/tube wherein the carriage movement is not required to be substantially changed in order to provide a change in bag size and/or to effect stripping or other function.

It is still a further object of the present invention to provide a stripper/sealing and/or blousing apparatus and method that is operative at maximum speed and efficiency in response to computer control and utilizing a 3-axis coordinator; the Y motion of the stripper/sealing jaws serving as the master controller for the X motion of the stripper/sealing jaws and the variable feed of the film.

It is still a further object of the present invention to provide an apparatus/method of forming a bag including feeding/stripping/blousing of the bag with no variation in movement of the stripper/sealing jaws so as to thereby rely on continuous feeding of the film at a variable rate.

Additional objects, advantages and other novel features of the invention will be set forth in part in the description that follows, and in part will become apparent to those skilled in the art upon examination of the following, or may be learned with the practice of the invention. The objects and advantages of the invention may be realized and attained by means of the instrumentalities and combinations particularly pointed out in the appended claims.

Accordingly, to achieve the foregoing and other desirable objects, and in accordance with the purposes of the present invention, an improved apparatus is provided for forming a continuous package film tube into a succession of bags characterized by even more increased speed and efficiency than heretofore attainable. In particular, the speed and efficiency is attained without the need for employing a rotating head assembly with multiple carriages, that has been resorted to by a large sector of the form, fill and seal industry in the past. We have found that we are able to match, and indeed in some instances, exceed the speed/efficiency of these prior art efforts. Furthermore, especially taking into account the high cost of providing multiple carriages and the increased cost of maintenance due to high inertia and strain on such prior art systems, our new approach results in a major step forward in the art.

The present invention takes advantage of providing computer control of stepper/servo motors for operating the three key motions of the reciprocating stripper/sealing jaw carriage and the film feed in a radically different manner. Instead of providing intermittent feed of the film/tube and varying the movement of the carriage to cause the required relative movement with respect to the film/tube, we propose movement of the carriage in a constant motion over a limited reciprocating/oscillating path and varying the movement of the film so as to perform the necessary functions. Because the film/tube, as well as its feeding means, is relatively low mass, the required rapid accelerations and decelerations can be carried out much easier than such changes can be interposed on the carriage, as has been done in the past.

Thus, in accordance with the preferred embodiment of our present invention, a combined stripping and sealing apparatus for packaging product in a bag formed from a continuous film tube in a form, fill and seal packaging system is provided wherein a single carriage moves along a reciprocating/oscillating fixed path, and with a constant or continuous profile motion. The apparatus includes means for driving the carriage with the stripper/sealing jaws mounted thereon in a substantially constant sine wave motion. There is no variation in carriage motion for stripping, or performing other ancillary functions, such as blousing; it being understood that this is performed by varying the relative speed of the film feed. In particular, the computer control means includes a multi-axis coordinator, for controlling the packaging operation with respect to at least 3-axes; i.e. there is programmable computer control to operate a pair of servo motors, one for the carriage drive and one for the in and out sealing jaw movement, and to operate stepper motors to vary the film feed and seaming of the film. This minimizes carriage motion, allows easy selection of the desired bag size, and maximizes packaging machine speed at the same time.

As indicated, in accordance with the preferred embodiment the driving means for the carriage operates to define a constant modified sine wave. This serves in effect to allow maximum cycle time for stripping and sealing. The acceleration along the return or upward movement portion of the cycle is increased within the given reciprocating/oscillating movement inertia limits. This is done to extend the time available for the critical stripping/sealing functions.

Preferably, the servo motors for driving the carriage, as well as for selectively moving the stripper/sealing jaws in and out, employ a crank and drive linkage. Departing from the prior art, the carriage servo motor and crank of the present invention operates through full 360° rotations providing the desired relatively smooth, continuous constant carriage Y-axis motion (along the longitudinal or vertical axis). On the other hand, the servo motor operating a crank for moving of the stripper/sealing jaws oscillates back and forth under the control of the 3-axis coordinator in synchronization with the carriage drive. Thus, while the carriage drive is a constant, modified sine wave Y-axis motion, the X-axis motion of the stripper/sealing jaws exhibits a stepped position profile, including first stripping, and then secondly, sealing.

Since the crank is interposed between the servo motor of the carriage drive and the drive linkage, the typical modified sine wave is a complex combination of the two motions. In order to provide the output in the sine wave motion desired, the typical velocity profile of the servo motor is stepped down from a maximum, reaches a mid-point for stripping and then minimum velocity for sealing, is accelerated back to a maximum and then stepped back down to a reduced velocity for the majority of the carriage return motion before returning to the original maximum velocity. The typical X-axis motion for the stripper/sealing jaws defines a rapid movement inwardly to a mid-point position for stripping, then all the way in for sealing and then back to the selected open position.

For the continuous feeding of the film at the programmed variable rate in order to provide the proper stripping, sealing and other functions, which is identified as Y'-axis motion, with each cycle the stepper motors start at a maximum and then decelerate rapidly to a minimum. This establishes the required relative motion with respect to the stripper jaws mounted on the sealing jaws of the carriage. Next, the velocity is rapidly increased to reach a modified acceleration causing the movement of the film/tube to match the movement of the sealing jaws with the film/tube for sealing. Then the stepper motors rapidly accelerate back to the maximum as the carriage returns through the TDC position and starts the formation of the next bag. When blousing is desired, the film speed is simply reprogrammed to increase the acceleration toward the end of the forming movement, such as during sealing, thereby causing the bottom of the next bag in the series to be bulged out against the blousing or crumb plates along the top of the sealing jaws. For adjusting the size of the bags, the mean velocity of the film/tube F during the return or upward stroke of the stripper/sealing jaws carriage can be increased or decreased.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE PREFERRED EMBODIMENT

Figure 1:
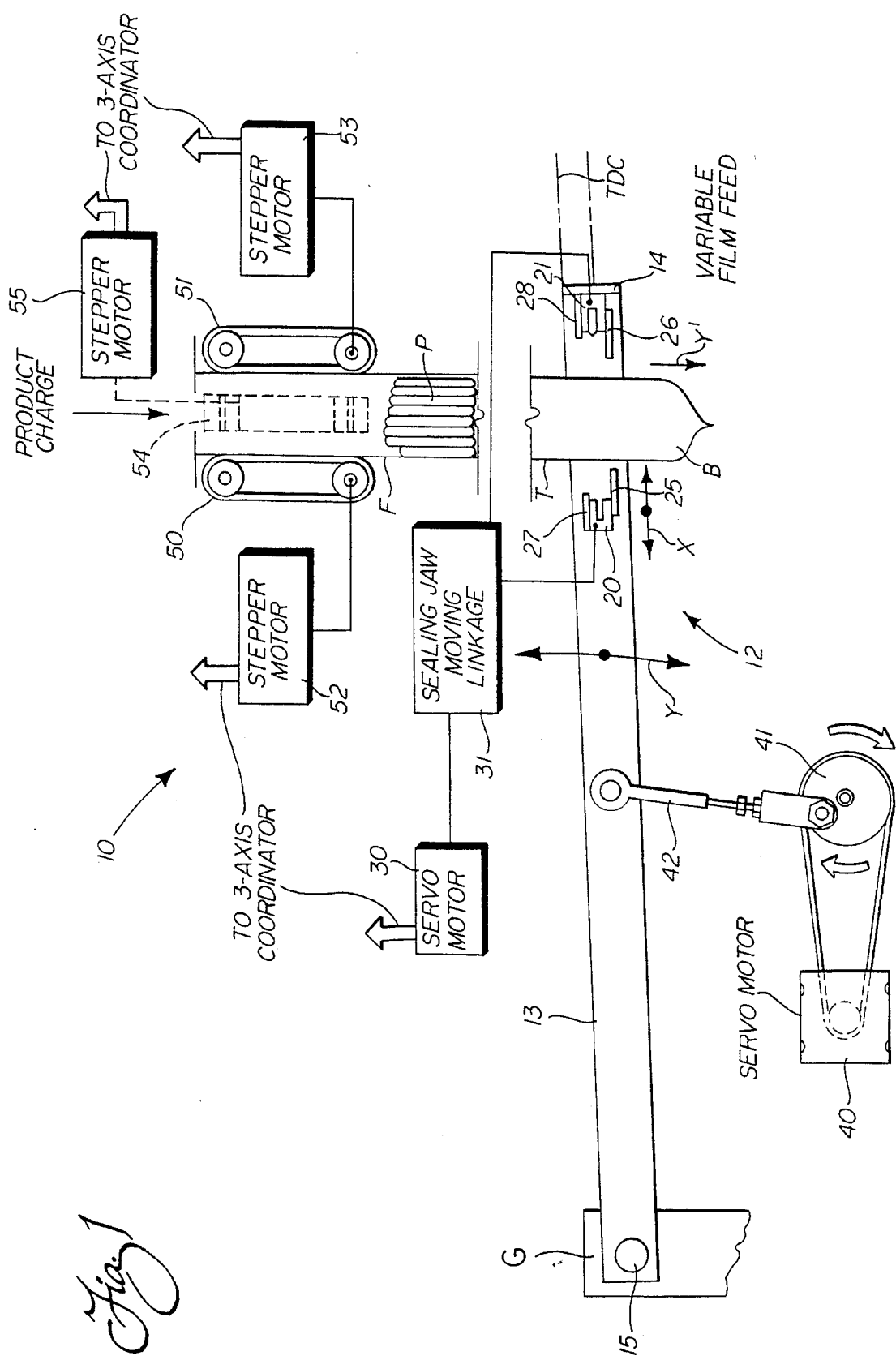
FIG. 1 is a schematic view of the stripping and sealing apparatus and including a representation of the oscillating carriage of the preferred embodiment of the present invention and showing a typical relationship of the components and product being packaged.

Reference is now made to the schematic view of FIG. 1 showing the improved stripping and sealing apparatus 10 for use in packaging product charges P in a bag B sequentially formed from a continuous film F formed in a tube. A carriage, generally designated by the reference numeral 12, includes a pair of swing arms or rails 13 (only one shown) and a front cross rail 14. The swing arm 13 reciprocates/oscillates about pivot pin 15 mounted on a portion of the machine frame G. As can be seen in detail in FIGS. 1 and 3–6, the carriage 13 oscillates up and down along the film/tube F. For more detail of the carriage 13 and its prior art operation, reference is made to one of the prior U.S. Patents referenced above, U.S. Pat. Nos. 4,996,825 or 5,062, 253 assigned to the assignee of the present invention and incorporated herein by reference.

Mounted for movement toward and away from the film/tube F is a pair of sealing jaws 20, 21, which also includes a cut-off knife (not shown); the sealing jaws 20, 21 operating in unison in a known fashion to form a transverse seal, cut and release each formed bag B in proper timed sequence. Mounted below and as a part of the two sealing jaws 20, 21 are slidable, plate-like stripper jaws 25, 26 that are spring loaded to their extended position (see FIG. 1). In the extended position of the stripper jaws 25, 26, they are in a position to fully engage the film tube T and strip the product from the seal area prior to the final movement of the sealing jaws 20, 21 together for sealing. Similarly, above the sealing jaws 20, 21 can be provided blousing or crumb plates 27, 28 as an alternative feature.

The actual reciprocating/oscillating motion of the sealing jaws 20, 21 is carried out by a servo motor 30, mounted on the carriage 13 and coupled by a suitable moving linkage, designated in block form in FIG. 1 by reference numeral 31. The moving linkage 31 may include one or more cranks, and pivotally attached to each crank is a corresponding arm connected to each of the sealing jaws 20, 21, as more fully disclosed and referenced in the prior '825 and '253 patents.

The blousing plates 27, 28 are spaced from the sealing jaws 20, 21 in order to remain substantially insulated therefrom. As is usual, air circulating under the plates 27, 28 keeps them relatively cool to allow engagement with the bottom of each subsequently formed bag. Unlike the stripper jaws 25, 26, the blousing plates 27, 28 are not spring loaded and are simply positioned so as to be slightly spaced from each other to accommodate the thickness of the packaging tube T. The spacing is sufficient to stop falling crumbs from above, but without tightly engaging the tube like the stripper jaws 25, 26.

In order to simplify the description of the present invention, the reciprocating or in and out motion of the sealing jaws 20, 21 may be referred to as X-axis motion of the stripper/sealing jaws. This is referenced in FIG. 1 by the oppositely directed action arrow X adjacent the sealing jaw 20. Similarly, the reciprocating/oscillating movement of the carriage 13 is hereinafter referred to as the stripper/sealing jaws motion Y; this being understood to denote the movement along the longitudinal or Y-axis (see also FIG. 1). Finally, as will also be described more fully below, the variable and programmable longitudinal continuous movement of the film/tube F along the same Y axis is referenced as the film feed motion Y'. In accordance with the present invention, these three motions X, Y, Y' are coordinated in a novel and advantageous manner in order to bring about an increase in package forming efficiency with the added benefit of maximizing packaging machine speed.

In order to provide the stripper/sealing jaws motion Y, a servo motor 40, mounted on the frame G of the machine is provided, which in turn drives a crank 41 in a continuous fashion around a full 360° circle (see FIGS. 1 and 3–6). Connecting the crank 41 to the carriage 13 is a driving link 42. As illustrated in the position of FIG. 1, the bottom seal of the bag B is formed, an incoming product charge P is in flight and the carriage 13 is approaching its top dead center (TDC) position. While the product charge P in the showing of the drawings is an array of sticks, such as pretzel sticks, it is to be understood that any other relatively free-flowing product, such as potato chips or the like, benefit from the principles of the present invention.

In order to provide the continuous and programmable feed of the film F, a pair of endless feed belts 50, 51 engage the film on opposite sides of a forming mandrel (not shown). One of each of the two rollers supporting the belts 50, 51 is connected for driving by stepper motors 52, 53. On the backside of the film F is illustrated in dashed line form, a heated belt 54 for forming the back seam of the tube. Stepper motor 55 drives the belt 54 in substantial synchronization with the stepper motors 52, 53.

In accordance with an important feature of the present invention, the feed of the film/tube F through its motion Y' is both variable and programmable; whereas, in the past in similar package machines or methods employing a reciprocating/oscillating carriage, the film feed F is selected as being in a substantially constant pattern (see '253 patent and others referenced above). The driving of the film/tube F in this prior art manner has worked reasonably well in the past. However, this feature necessarily requires all of the relative movement between the film/tube motion Y' and the stripper/sealing jaws longitudinal motion Y to be provided by inducing variation in the stripper/sealing jaw motion Y. Our discovery is that this causes a substantial difficulty originating from the physical mass of the carriage 13, especially when considering the relatively large mass of the sealing jaws 20, 21, as well as the stripper and blousing plates 25–28. Because of this, the effective packaging machine speeds, especially when forming relatively small packages in accordance with these known teachings, causes the packaging machine speed to be severely restricted. Thus, we have chosen to program and drive the film/tube F so as to provide a variable, but preferably continuous, film feed motion Y' and maintain the reciprocating/oscillating motion Y as the relatively constant modified sine wave motion. It is with this change that we have discovered that the packaging operation can operate at its highest efficiency with minimum cycle time without sacrificing precise control. The relatively low mass of the film/tube F and the driving belts 50, 51, 54 and the inherent instant response of the stepper motors 52, 53, 55 is a strong contributing factor to these outstanding results. We are able to gain a substantial increase in speed over the prior art arrangements, but with the lowest over-all up-front cost and with minimum maintenance requirements.

Figure 2:
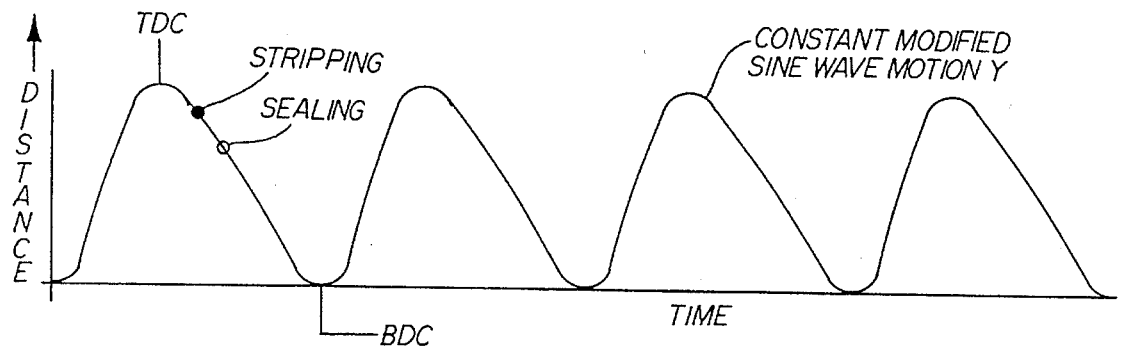
FIG. 2 is a representative showing in graphical form of the constant modified sine wave profile of the motion of the carriage including the stripper/sealing jaws.

As best illustrated in FIG. 2, the movement of the carriage 13 to establish the stripper/sealing jaws motion Y simply repeats itself and thus remains constant throughout the entire packaging operation. At the initial portion of the graphical representation, the carriage 13 is returning and rapidly accelerates toward and passes through the top dead center (TDC) position in readiness for forming the next package. This action can be seen by viewing the representation in FIG. 1, where the carriage 13 is returning from passing through the bottom dead center (BDC) position and the TDC position is being approached. As is apparent, throughout this time period the sealing jaws 20, 21, including the stripper jaws 25, 26 are fully open.

As the carriage 12 travels toward and through the TDC position, that is, the crank 41 drives the linkage 42 through its highest point, the downward carriage movement for stripping/sealing and otherwise forming the bag B is ready to begin. This is best seen by comparing the illustrations in FIGS. 2 and 3. As forming begins, the curve of the sine wave motion Y starts to slope downwardly. This occurs at a substantially constant and relatively gentle slope until the carriage 12 passes through the BDC position.

As will be apparent, the acceleration/mean velocity on the upward or return stroke of the carriage 13 is about twice that of the movement along the downward curve. This arrangement is for the purpose of providing better control of the stripping operation, designated by the strip dot on the curve, as well as the sealing operation, designated by the referenced seal circle 0, as shown in FIG. 2. As illustrated, the slope of the curve as the carriage 13 returns through TDC is preferably approximately twice as steep as the slope of the curve providing the stripping and sealing. This allows greater time in the overall cycle for these two critical operations.

Figure 3:
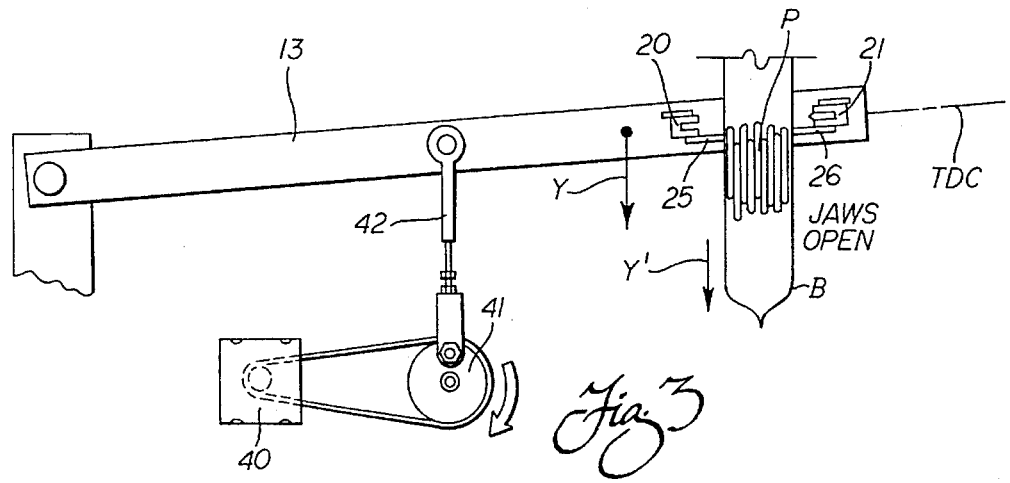
FIG. 3 is a schematic illustration of the position of the carriage and the stripper/sealing jaws occurring just after the position shown in FIG. 1; the carriage passing through the top dead center (TDC), the stripper/sealing jaws open and the product charge dropping down further in the bag being formed, all at the start of a typical packaging cycle.

Thus, with reference to FIG. 3, the carriage 13 is shown passing through the TDC position with the product charge P now closely approaching the bottom of the bag B. With relation to the curve in FIG. 2, the carriage starts to proceed along the relatively gentle downward slope, as previously described. At the same time, the servo motor 30 and linkage 31 start to move the stripper jaws 25, 26 inwardly against the film/tube F. Concurrently, the variable film feed motion Y' is decelerating from its maximum velocity to initiate the stripping action, as will be described in more detail below.

Figure 4:
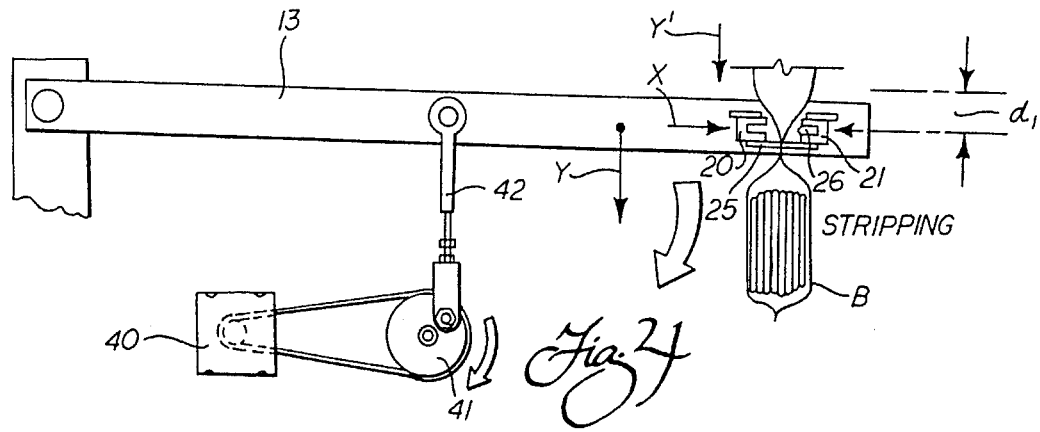
FIG. 4 is an illustration of the carriage with the stripper plates closed and stripping the seal area prior to the formation of the top seal in the typical operational sequence illustrated.

Thus, with reference to FIG. 4, the stripping action is illustrated to be taking place along the selected distance $d_1$. As indicated above, this correlates to the position of the dot along the initial section of the downward slope of the curve in FIG. 2.

Figure 5:
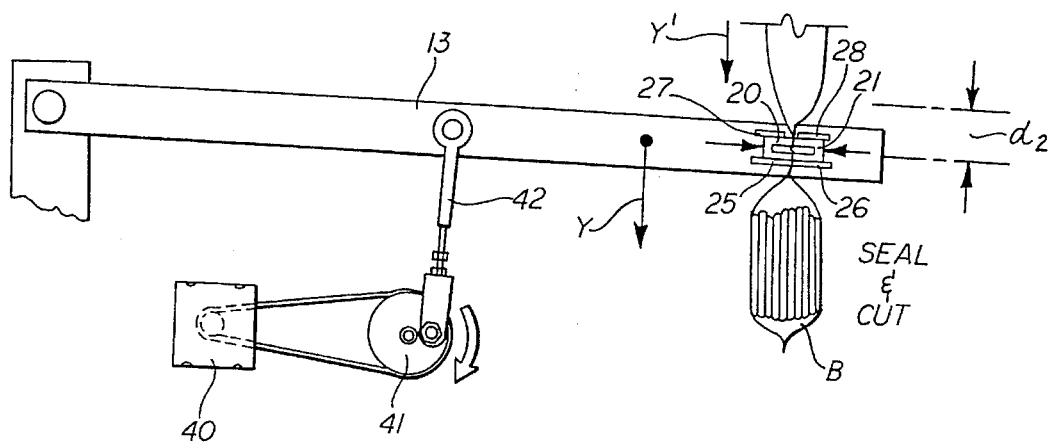
FIG. 5 is an illustration of the position of the carriage and the stripper/sealing jaws after the stripping operation and during the seal and cut operation in the typical sequence illustrated.

In the next operational sequence of the packaging cycle, the servo motor 30 and the sealing jaw moving linkage 31 continues inwardly so as to move the sealing jaws 20, 21 to their full closed position; thereby performing the seal and cut operation to complete the bag B. As illustrated in FIG. 5, the distance $d_2$ represents the matching of the sealing jaw motion Y with the film/tube feed motion Y'. With reference back to FIG. 2, the sequence of FIG. 5 is seen to occur along the next section of the downward slope of the curve, as designated by the circle.

Figure 6:
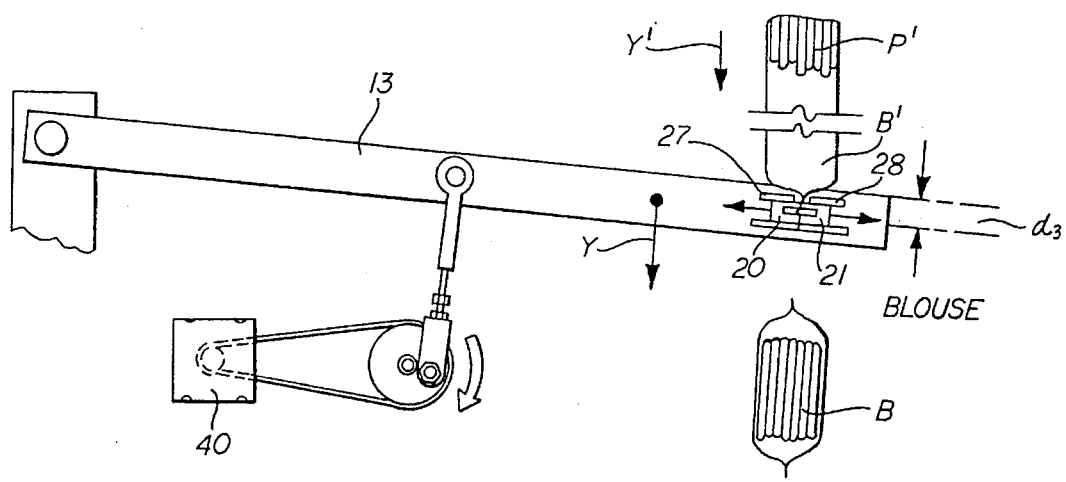
FIG. 6 is an illustration of the alternative function provided for blousing of the next bag to better receive the product charge in the typical sequence illustrated.

The final operational sequence in the package forming portion of the cycle is illustrated in FIG. 6. In this portion of the sealing section, the blousing plates 27, 28 are effective in momentarily supporting the bottom of the next bag B' that is ready to be formed. In this manner, the alternative operation of blousing the bottom of the bag to open it up for more effective receipt of the product charge P is provided. This feature is generated by the relative movement caused the film/tube F momentarily overtaking the carriage 13 along a distance $d_3$. The next product charge P' is on its way and is able to more easily enter to this next in line bag B'.

Figure 7:
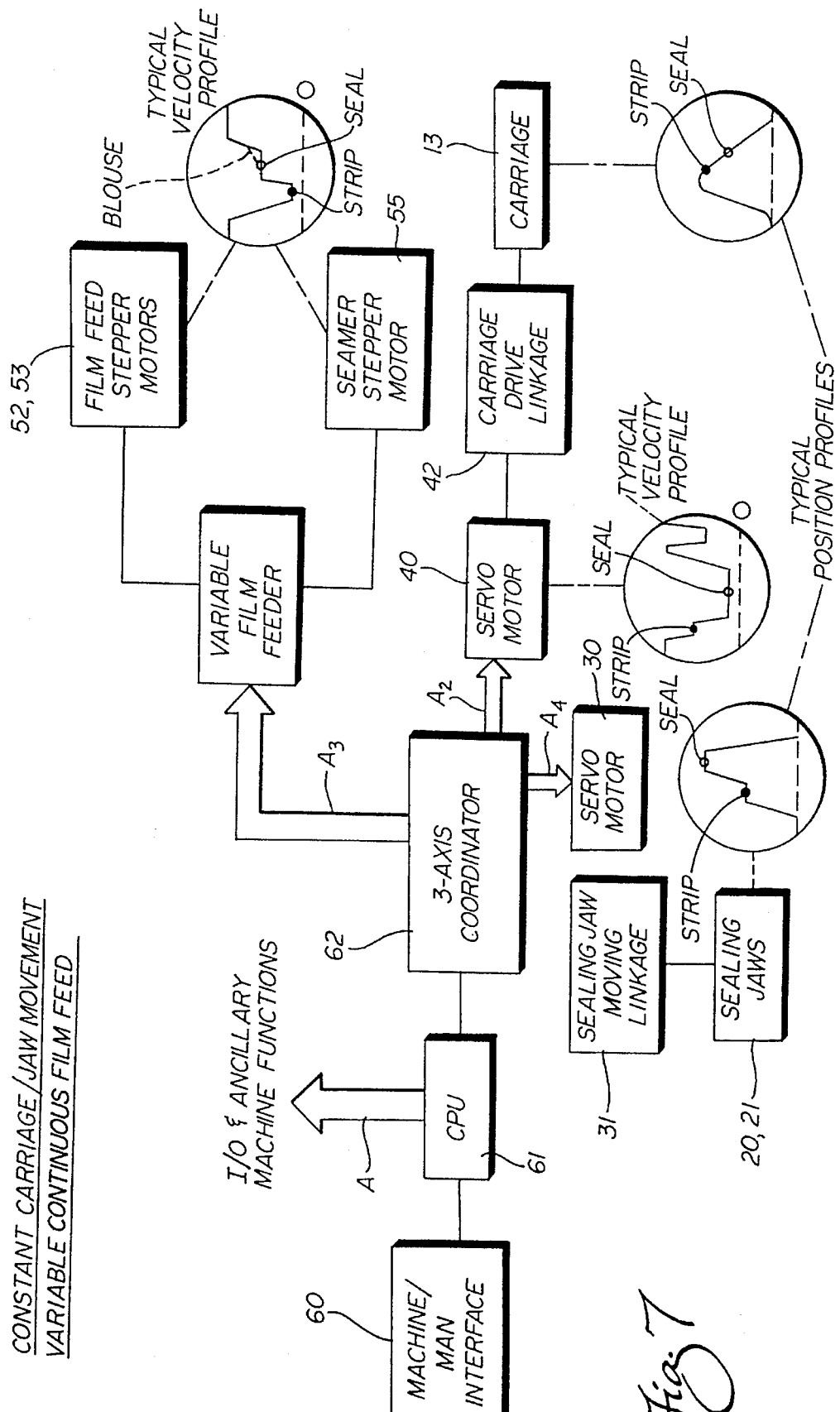
FIG. 7 is a full schematic view in block diagram form showing a computerized system for carrying out the principles of the preferred embodiment of the present invention.

With reference now to FIG. 7, a more detailed review of the entire stripping and sealing apparatus 10 of the present invention can be made. In order to provide the appropriate control input, a control means in the form of a machine/man interface 60 is provided. The computer is represented by a central processing unit (CPU) 61. In the preferred embodiment, the CPU 61 is based on an IBM compatible PC 486 with a MS/DOS operating system. As designated by the function arrow A, all input/output and ancillary machine functions are operated directly from the CPU 61.

Forming an integral part of the CPU 61 is a multi-axis coordinator 62 operative to control at least 3 axes, either through hardware or software, or both; i.e. there is control of the three critical motions X, Y and Y' in a manner to provide the exceptional results and advantages of the present invention. Thus, from the 3-axis coordinator 62, as designated by the function arrow $A_2$, the servo motor 40 receives its commands and through the carriage drive linkage 42 serves as the driving means to operate the carriage 13. An important feature of this function of the 3-axis coordinator 62 is that the induced modified sine wave motion Y of the carriage 13, as described with respect to FIG. 2, serves as the master control for the entire stripping and sealing apparatus 10 and the related method. A typical position profile of one cycle of the carriage movement is shown in the attached display circle in FIG. 7 (cf. FIG. 2). From the zero or home position, the carriage 13 rises rapidly and passes through the TDC position and then descends more gently along the first section of the curve in order to provide the desired stripping (note the strip dot), and then through the second section for sealing (note the seal circle). In this manner, the carriage 31 does not have to change speed during actual formation of the bag B during the packaging operation, but instead it operates through the constant or continuous motion profile in a substantially constant sine wave selected to optimize the packaging operation.

In order to establish a feeding means for the film/tube F, as well as establish the relative movement between the film/tube F and the stripper/sealing jaws 20, 21, 25, 26, the 3-axes coordinator 62, as indicated by the function arrow $A_3$, operates the stepper motors 52, 53, 55 in a continuous and controlled manner. As illustrated by the typical velocity profile, as set forth in the display circle of FIG. 7, the motion Y' is established by this operation and is characterized by: (1) at the start in each cycle by a maximum velocity; (2) a quick deceleration to a stripping velocity that is gauged to be less than the velocity of the stripper/sealing jaw motion Y along the section designated by the strip dot; (3) acceleration quickly up to a medium, slightly increasing velocity to exactly match the velocity of the Y motion of the carriage 13 for sealing; and (4) a rapid acceleration back up to the maximum velocity for feeding the next length of the film/tube F. It will be noted that in step (2) for stripping, the velocity of the film/tube F is reduced to its minimum, but is not stopped; i.e. the feed is continuous. This is advantageous since at no time does the film/tube F have to start from zero and thus overcome static friction. This feature of continuing to move the film/tube F obviates the chance of breaking the film (even relatively weak film) since the substantial extra pull required for overcoming static friction is not experienced during normal operation.

In the instance where the alternative of blousing the bottom of the bag is to be effected, a steeper acceleration profile is selected along at least a part of the sealing section of the curve in order to cause the bottom of the next bag B' to move slightly faster and press against the blousing plates 27, 28 of the sealing jaws 20, 21 (see the dashed line portion of the curve in FIG. 7; cf. FIG. 6).

Furthermore, to conveniently control the length of the bag B, the velocity profile (see display circle in FIG. 7) can be shifted through operator input to the interface 60. For example, the deceleration of the step (2) can be made more rapid, shifting the profile to the left in the circle, thereby extending the maximum velocity, as represented by the right side of the profile. As indicated above, this feature allows selection of different bag sizes without changing the optimum, fixed frequency, constant sine wave motion of the carriage 13. In turn, downstream handling, such as in a case packer, does not have to be changed with a change in bag size, and thus can continue to operate at maximum output. No intervening timing conveyor system is required to accomplish this desirable result.

The third of the three axes to be controlled is illustrated by review of the typical position profile of the sealing jaws 20, 21, also as shown in FIG. 7. Starting from the open position along the bottom line: (1) the jaws 20, 21 are caused to move rapidly inwardly to a midpoint, designated by the strip dot; (2) followed by rapid movement inwardly to the full sealing position designated by the seal circle; and then (3) a rapid return to the selected open position.

In order to provide the position profile of the carriage 13, as described above, it is apparent that the servo motor 40 must operate at a substantially fixed velocity profile. This is so that when its motion is combined with the full 360° rotation of the crank 41, the position profile will be as indicated; that is, a substantially constant, modified sine wave profile. Thus, a typical velocity profile of the servo motor 40 includes: (1) starting at the maximum velocity, a rapid stepped deceleration to two substantially constant velocities, first at a mid-point for stripping, and then at a lower velocity for sealing; (2) a rapid acceleration back to the maximum velocity; (3) a rapid deceleration to a mid-velocity point during the return of the carriage 13 to the TDC position; and (4) a rapid acceleration back to the maximum velocity in readiness for the next package forming portion of the cycle.

In summary, it can be seen that substantial results and advantages over the prior art intermittently, as well as known continuously, operating packaging machines and methods is realized. The considerable advantages of utilizing a simple, single reciprocating/oscillating carriage 13 are now clear, including low initial cost and reduced maintenance. At the same time, dramatic increases in efficiency and speed of operation are realized by employing computer control of the variable film feeder. When only the velocity of the film/tube F is required to be changed, as indicated by the motion Y', and as described, the carriage 13 can operate on a substantially constant modified sine wave motion Y. This means the rapid changes in relative velocity required to carry out the stripping, sealing and/or blousing operations can be performed very efficiently. Because the film/tube F is very low mass, it can quickly accelerate/decelerate to the required velocity to match the differential or same velocity with respect to the carriage 13 that is necessary. By input control through the interface 60, the operator can fine tune the packaging operation in any manner desired. The desired strip length, the incorporation of the alternative function of blousing and/or other functions, as well as the length of the bag can be adjusted by simply varying the velocity profile and the motion Y' of the film/tube F. In any selected mode of operation, the carriage sine wave motion Y serves as the master control to which the film/tube feed motion Y' is able to track. The stripper/sealing jaws motion X matches the carriage motion Y to assure proper stripping and sealing.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, although not shown, encoders are provided to monitor through the 3-axis coordinator the operation of the servo motors 40, 30 in order to assure synchronization of the carriage driving and the stripper/sealing jaws movement. Similarly, feedback can be provided from the stepper motors 52, 53, 55 but only for minor corrections, such as interposed into the system by film stretching. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. A film feeding and sealing apparatus for use in packaging product in a bag formed from a continuous tube of film in a form, fill and seal packaging machine, comprising:

means for feeding said film at a variable rate;

a carriage;

means for driving said carriage in a longitudinal direction along said tube in a substantially constant sine wave motion;

sealing jaw means mounted on said carriage for movement between closed and open positions;

means mounted on said carriage and connecting to said sealing jaw means for selectively moving said sealing jaw means in a first direction toward the closed position for sealing, and moving said sealing jaw means in a second direction toward the open position to release the formed bag; and control means for varying the movement of said film to track the driving of said sealing jaws in the longitudinal direction to coordinate the relative movement of said film/tube and said carriage for proper bag forming and sizing while maintaining the substantially constant sine wave motion of said carriage;

whereby said film feeding and said sealing is performed in a precise manner while minimizing the effects of inertia on said carriage and to maximize packaging machine speed.

2. The film feeding and sealing apparatus of claim 1, wherein:

said driving means operates in the longitudinal direction along the tube so as to provide a modified sine wave motion including a rapid return of the sealing jaw means when in the open position.

3. The film feeding and sealing apparatus of claim 2, wherein:

said driving means operates in the longitudinal direction along the tube so as to provide continuous motion of said film/tube.

4. The film feeding and sealing apparatus of claim 1, wherein:

said driving means includes a servo motor and a crank means operated for full rotational movement in response to said servo motor; and drive linkage connecting said crank means to said carriage to provide the movement in concert with said servo motor alternately in the direction opposite to bag forming and in the direction of bag forming.

5. The film feeding and sealing apparatus of claim 4, wherein:

said moving means includes a servo motor and linkage mounted for reciprocating movement in response to said servo motor.

6. The film feeding and sealing apparatus of claim 1, wherein:

said feeding means includes at least one stepper motor and an endless feed belt driven by said stepper motor and engaging said film; and said control means operating said stepper motor so as to rapidly accelerate and decelerate said film to properly form the bag as it tracks the movement of the carriage;

whereby to provide the precise relative movement of the film with respect to said carriage and said sealing jaw means in response to movement of the film and thereby maximize packaging machine speed.

7. The feeding and sealing apparatus of claim 1, wherein is further provided:

stripper means on said sealing jaw means for stripping the product prior to sealing;

said control means being programmable to coordinate the movement of the stripper/sealing jaw means for stripping;

whereby said feeding and said sealing, as well as said stripping, is performed in a precise manner while minimizing the effects of inertia on said carriage to thereby maximize packaging machine speed.

8. A method of feeding and sealing of a bag to be filled with product and formed from a continuous film tube in a form, fill and seal packaging operation comprising the steps of:

feeding a length of film/tube corresponding to the bag length between a pair of sealing jaws;

driving said sealing jaws in a longitudinal direction along the length of the film/tube in a substantially constant sine wave motion;

varying the feed of the film to coordinate the relative movement of said film/tube and said sealing jaws for forming the bag while maintaining the substantially constant sine wave motion of said sealing jaws;

moving said sealing jaws in a first direction to engage and seal on opposite sides of the film;

moving said sealing jaws in a second direction toward the open position to release the formed bag;

driving said sealing jaws in the direction opposite to that of bag forming; and controlling the movement of said film so as to track the driving of said sealing jaws in the longitudinal direction;

whereby the feeding is performed in a precise manner while minimizing the effects of inertia of the sealing jaws and to maximize the speed of the packaging operation.

9. The method of film feeding and sealing of a bag of claim 8, wherein is further provided:

in the step of driving said sealing jaws in the direction of forming the bag, providing a modified sine wave motion including a rapid return of the sealing jaws when in the open position.

10. The method of film feeding and sealing of a bag of claim 8, wherein is further provided:

maintaining the feed of the film in a continuous motion.

11. The method of film feeding and sealing of a bag of claim 8, wherein is further added stripping of the film tube comprising the additional steps of:

feeding the length of film between a pair of stripper jaws on said sealing jaws;

driving and moving said stripper/sealing jaws along the bag and toward the closed position to engage said stripper jaws on opposite sides of the film prior to sealing;

stopping the movement in the first direction in a stripping position;

feeding said film at a rate less than that of said sealing jaws to provide relative movement in the direction of bag forming to provide the stripping action;

feeding said film at substantially the same speed as said sealing jaws and concurrently continuing the movement of said sealing jaws in said first direction to the closed position for sealing and forming said bag;

moving said stripper/sealing jaws together in the second direction toward the open position to release the formed bag.

12. The method of film feeding, stripping and sealing of a bag as set forth, in claim 11, wherein is further provided blousing comprising the additional steps of:

continuing the feed of said film during engagement of said stripper/sealing jaws; and feeding of said film faster relative to the movement of said stripper/sealing jaws to cause the film to blouse;

whereby the film/tube is temporarily forced open to provide improved reception of the product being packaged.

* * * * *